United States Patent
Jung et al.

(10) Patent No.: US 7,330,607 B2
(45) Date of Patent: Feb. 12, 2008

(54) APPARATUS AND METHOD FOR CONTROLLING AN AUTO-ZOOMING OPERATION OF A MOBILE TERMINAL

(75) Inventors: Jee-Young Jung, Busan (KR); Jae-Ik Jung, Daegu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 671 days.

(21) Appl. No.: 10/901,036

(22) Filed: Jul. 29, 2004

(65) Prior Publication Data

US 2005/0074185 A1   Apr. 7, 2005

(30) Foreign Application Priority Data

Oct. 7, 2003   (KR) ................ 10-2003-0069661

(51) Int. Cl.
  *G06K 9/32*   (2006.01)
(52) U.S. Cl. .............. 382/298; 382/277; 382/286; 382/293; 348/347; 348/361; 348/376
(58) Field of Classification Search .......... 382/282, 382/286, 293, 298, 299; 348/347, 361, 376
See application file for complete search history.

(56) References Cited

U.S. PATENT DOCUMENTS

| | | | |
|---|---|---|---|
| 5,631,697 A | | 5/1997 | Nishimura et al. |
| 5,657,246 A | * | 8/1997 | Hogan et al. ............. 348/14.1 |
| 5,673,079 A | * | 9/1997 | Satoh ....................... 348/14.1 |
| 6,654,414 B1 | * | 11/2003 | Narayanaswami ..... 375/240.01 |
| 6,654,481 B2 | * | 11/2003 | Amemiya et al. ........... 382/103 |
| 7,127,120 B2 | * | 10/2006 | Hua et al. ................... 382/254 |

FOREIGN PATENT DOCUMENTS

| | | |
|---|---|---|
| EP | 1 158 786 | 11/2001 |
| EP | 1 324 597 | 7/2003 |
| JP | 06-160944 | 6/1994 |
| JP | 09-065197 | 3/1997 |

* cited by examiner

*Primary Examiner*—Yosef Kassa
(74) *Attorney, Agent, or Firm*—Roylance, Abrams, Berdo & Goodman, L.L.P.

(57) ABSTRACT

An apparatus and method for controlling an auto-zooming operation of a mobile terminal. The apparatus and method for controlling an auto-zooming operation of a mobile terminal can automatically adjust the size of a target subject captured by an image capture device such as a camcorder to be equal to a predetermined size irrespective of a distance between the image capture device and the target object. The apparatus and method includes the steps of a) determining whether an auto-zooming function is selected during a moving image capture mode, and determining a size ratio of a main target object to be captured when the auto-zooming function is selected; b) determining the determined main target object size ratio to be a reference ratio, and capturing the main target object; and c) determining whether a main target object size ratio of video data captured during the moving image capture mode is equal to the reference ratio, and performing a zoom-in operation or a zoom-out operation when the main target object size ratio of the captured video data is different from the reference ratio to enable the main target object size ratio that was changed during the moving image capture mode to be equal to the reference ratio.

14 Claims, 2 Drawing Sheets

APPARATUS AND METHOD FOR CONTROLLING AN AUTO-ZOOMING OPERATION OF A MOBILE TERMINAL

PRIORITY

This application claims priority under 35 U.S.C. § 119(a) to an application entitled "METHOD FOR CONTROLLING AUTO-ZOOMING OPERATION OF MOBILE TERMINAL", filed in the Korean Intellectual Property Office on Oct. 7, 2003 and assigned Serial No. 2003-69661, the entire contents of which are incorporated herein by reference.

BACKGROUND OF THE INVENTION

1. Field of the Invention

The present invention relates to an apparatus and method for controlling an auto-zooming operation. More particularly the present invention relates to an apparatus and method for controlling an auto-zooming operation of a mobile terminal such as a camcorder phone, which can automatically adjust the size of a target subject captured by the mobile terminal to be a predetermined size irrespective of a distance between the mobile terminal and the target object.

2. Description of the Related Art

A camcorder, which is an example of an image capturing device, can function as a general camera for photographing a target object and can also function as a video recorder for recording a series of events.

There is a need for the image capturing device such as a camcorder to perform appropriate exposure, focusing, and zooming operations in order to sufficiently reconstruct and satisfactorily capture a momentary image of the target object. The focusing and digital-zooming operations of the aforementioned image capturing device such as a camcorder will hereinafter be described.

A variety of focusing methods have been widely used for measuring a distance between a camera and a target object. A system for accomplishing this can be classified into an active system and a passive system. Examples of active systems include an ultrasound focusing system and an infrared focusing system. Passive systems include a contrast recognition method and an eye-controlled auto-focus system.

The active system will hereinafter be described. The ultrasound focusing system counts a time delay from an ultrasound transmission time to its echo reception time in order to calculate a distance between a camera and a target object, and automatically adjusts a lens based on the distance in order to perform a focus control operation. The infrared focusing system moves a lens to enable the infrared beam to be reflected from a target object in a scanning mode, and performs a focus control operation using a trigonometric measurement scheme.

The passive system will hereinafter be described. The contrast recognition method projects the same image on a mirror interoperable with a non-stationary lens and a fixed lens using a visitronic module, adds the images projected on the mirror and the fixed lens, focuses the images on the fixed lens, and closes a shutter. The eye-controlled auto-focus system horizontally installs five focusing points in a viewfinder, and enables a user such as a cameraman to select predetermined focusing points associated with a desired target object where the camera will be focused when the user views the target objects.

The user performs a focusing operation using the aforementioned auto-focus function during a moving image capture time, and presses a zoom-in key and a zoom-out key to capture an image of a main target object currently in motion, such that the size of the main target object can be maintained at a predetermined size during the image capture time.

However, the aforementioned conventional image capture device such as a camcorder cannot automatically control a screen image configuration. Thus, there is the conventional image capture device has a disadvantage in that the user must unavoidably move from a current position to another position whenever the main target object moves to another position. In other words, the user must maintain the same distance between the camera and the main target object. Also, the conventional image capture device has difficulty in detecting the image of the target object while maintaining the same distance between the camera and the target object even though the user directly moves to another position.

Furthermore, the conventional image capture device results in greater inconvenience for the user who presses a zoom-in key and a zoom-out key to maintain a predetermined distance between the camera and the target object, and has difficulty in consistently maintaining the size of a captured main target object while maintaining the predetermined distance between the camera and the target object using the zoom-in and zoom-out keys.

SUMMARY OF THE INVENTION

Therefore, the present invention has been made in view of the above problems, and it is an object of the present invention to provide an apparatus and method for controlling an auto-zooming operation. More particularly, the present invention relates to an apparatus and method for controlling an auto-zooming operation, which can automatically adjust the size of a target subject captured by an image capture device such as a camcorder to match a predetermined size irrespective of a distance between the image capture device and the target object.

In accordance with an embodiment of the present invention, the above and other objects can be accomplished by the provision of an apparatus and method for controlling an auto-zooming operation of a mobile terminal serving as a camcorder phone to automatically adjust a target object size to match a predetermined target object size. The method comprises the steps of a) determining whether an auto-zooming function is selected during a moving image capture mode, and determining a size ratio of a main target object to be captured when the auto-zooming function is selected; b) selecting the determined main target object size ratio to be a reference ratio, and detecting the main target object; and c) determining whether a main target object size ratio of video data captured during the moving image capture mode is equal to the reference ratio, and performing a zoom-in operation or a zoom-out operation when the main target object size ratio of the captured video data is different from the reference ratio to enable the main target object size ratio that was changed during the moving image capture mode to be equal to the reference ratio.

BRIEF DESCRIPTION OF THE DRAWINGS

The above and other objects, features and other advantages of the present invention will be more clearly understood from the following detailed description taken in conjunction with the accompanying drawings, in which.

In the drawings, the same or similar elements are denoted by the same reference numerals even though they are depicted in different drawings.

DETAILED DESCRIPTION OF THE PREFERRED EMBODIMENTS

Embodiments of the present invention will be described in detail with reference to the accompanying drawings. In the following description, a detailed description of known functions and configurations incorporated herein will be omitted when it may unnecessarily obscure the subject matter of the present invention rather unclear.

Figure 1:
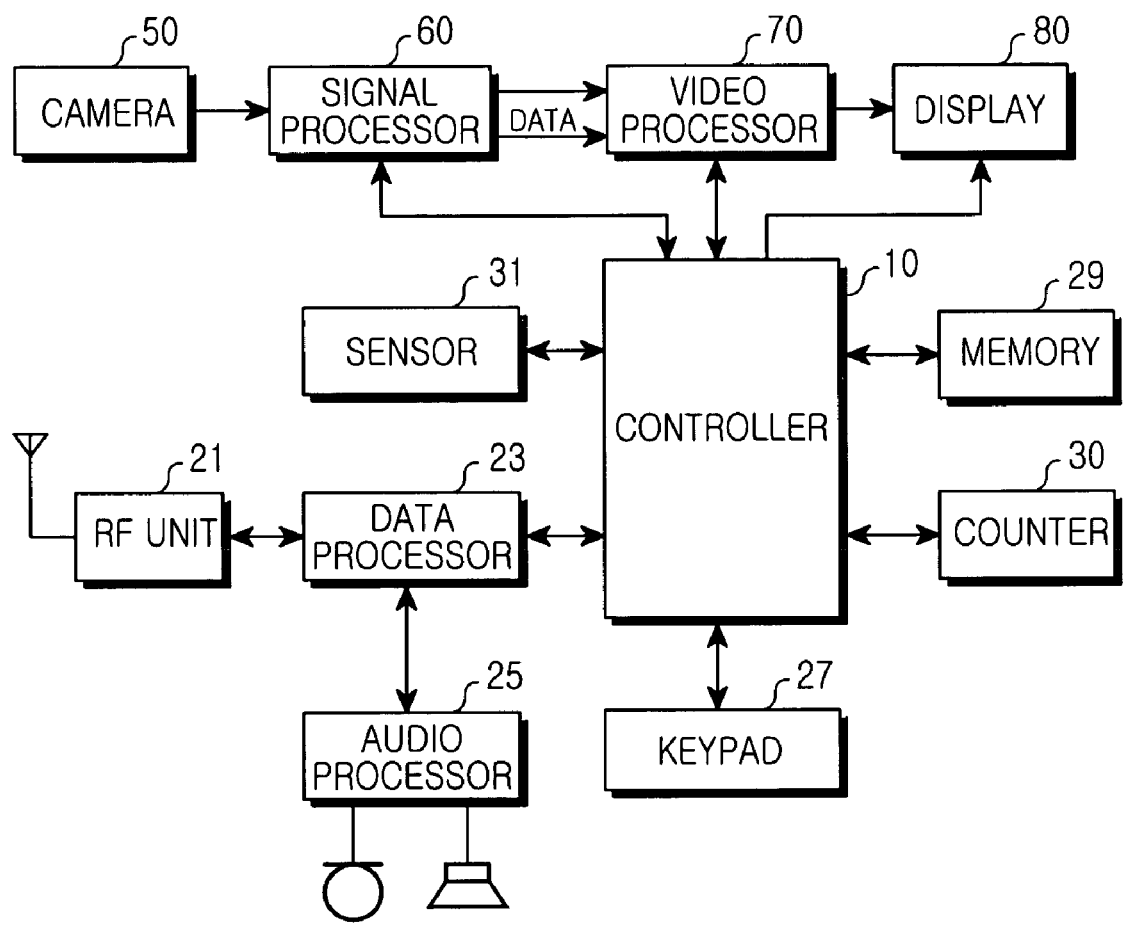
FIG. 1 is a block diagram illustrating an internal configuration of a mobile terminal having a camcorder function (i.e., a camcorder phone) in accordance with an embodiment of the present invention.

FIG. 1 is a block diagram illustrating an internal configuration of a mobile terminal having a camcorder function in accordance with an embodiment of the present invention.

Referring to FIG. 1, the Radio Frequency (RF) unit 21 performs a communication function. The RF unit 21 includes an RF transmitter (not shown) for increasing/amplifying a frequency of a transmission signal, and an RF receiver (not shown) for providing low-noise amplification for a reception signal, to reduce a frequency of the reception signal, and other well known functions of RF receivers.

The data processor 23 includes a transmitter (not shown) for coding/modulating the transmission signal, and a receiver (not shown) for demodulating/decoding the reception signal. In other words, the data processor 23 may comprise a modem and a CODEC.

The audio processor 25 reproduces a reception audio signal generated from the data processor 23, and also transmits a transmission audio signal generated from a microphone (MIC) to the data processor 23. The audio processor 25 compresses audio data received via the microphone (MIC) according to a prescribed scheme, recovers audio data that was compressed with video data, and transmits the recovered audio data to the speaker SPK.

The keypad 27 includes a plurality of keys for entering number and character information and a plurality of function keys for performing a variety of functions. The keypad 27 may further include a moving image capture mode key, a zoom-in key, a zoom-out key, a selection key, and an auto-zooming key, among others.

The memory 29 may include a program memory and a plurality of data memories. The program memory stores programs for controlling general operations of the mobile terminal. The program memory stores a predetermined size ratio of a main target object, and video data such as moving images and photos captured at the predetermined size ratio of the main target object. The data memory temporarily stores data generated while executing the programs.

The counter 30 is initialized by a reset signal upon receipt of the moving image capture mode key signal, and counts a time consumed for detecting the moving images.

The controller 10 controls overall operations of the mobile terminal. The controller 10 may include the data processor 23. If a moving image is captured using the auto-zooming function upon receipt of the auto-zooming key signal and the moving image capture mode key signal, the controller 10 transmits a reset signal to the counter 30, and counts the time it takes to capture the moving image.

During the counted time, the controller 10 controls overall operations associated with the auto-zooming function at intervals of a predetermined time. The controller 10 controls the captured moving image to be reproduced, and controls the display 80 to display the captured moving image.

The camera 50 includes a camera sensor for capturing video data and converting the captured optical signal into an electric signal. It is assumed that the camera sensor is a Charge Coupled Device (CCD) camera, although other types of camera sensors are considered to be within the scope of the present invention.

The signal processor 60 converts the captured video signal into an image signal. In this case, the signal processor 60 can be implemented with a Digital Signal Processor (DSP).

The video processor 70 generates video data to display the output image signal of the signal processor 60 on the display 80. The video processor 70 processes the output video signal of the camera 50 in frame units, and outputs the video data to be compatible with characteristic and size information of the display 80. The video processor 70 compresses the video data according to a prescribed scheme, and decompresses the compressed image data to restore to the original video data. The video processor 70 generates a video signal equal to the main target object size ratio that was initially determined by a camera user upon receiving a control signal from the controller 10.

The display 80 displays video data generated from the video processor 70, and displays user data generated from the controller 10. The display 80 displays video data reproduced by a control signal of the controller 10. The display 80 may be implemented with a Liquid Crystal Display (LCD). In this case, the display 80 may include an LCD controller, a memory for storing video data, and an LCD panel, etc. If the LCD is implemented with a touch screen, the keypad 27 and the LCD may function as an integrated unit.

An auto-zooming control method for use in a mobile terminal (hereinafter referred to as a camcorder phone) capable of supporting a camcorder function will hereinafter be described with reference to FIG. 1. The controller 10 determines whether a user presses the moving image capture mode key using the keypad 27. If it is determined that the user has entered the moving image capture mode key, the controller 10 performs an auto-zooming function. If a size ratio of the main target object to be captured is determined, the controller 10 stores the determined size ratio in the memory 29, initializes and drives the counter 30, controls the counter 30 to count the time it takes to capture the moving image, and begins to capture the moving image. Thereafter, the controller 10 reads from the counter 30 information indicative of the amount of time during which the moving image has been captured.

If it is determined that the read image capture time is equal to a predetermined time, the controller 10 reads coordinate information of the target object on the basis of the video data captured by the camera 50, calculates an area of the read coordinate, compares the main target object size ratio obtained by the calculation result with a predetermined main target object size ratio stored in the memory 29, zooms in on the image of the main target object according to an interpolation method adapting peripheral pixel data by an error generated by the comparison result, and zooms out from the image of the main target object according to a 3×3 median method, such that a moving image capture operation can be performed at a predetermined size ratio of the main target object. A method for automatically adjusting the size of the target object will hereinafter be described with reference to FIG. 2.

Figure 2:
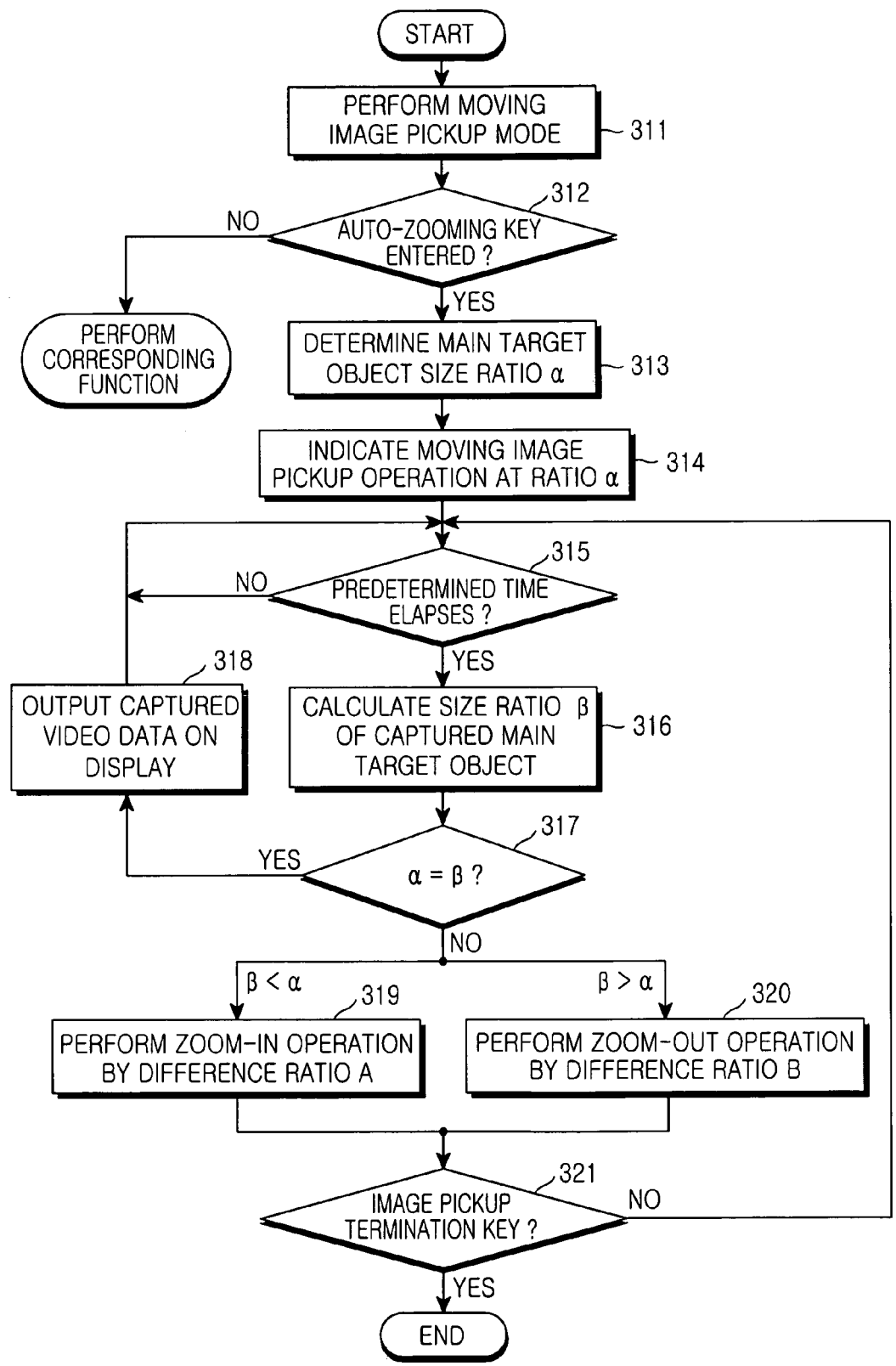
FIG. 2 is a flow chart illustrating a method for controlling an auto-zooming operation of a camcorder phone in accordance with an embodiment of the present invention.

FIG. 2 is a flow chart illustrating a method for controlling an auto-zooming operation of a camcorder phone in accordance with an embodiment of the present invention.

Referring to FIG. 2, if a user presses a moving image capture mode key of the keypad 27 to perform a moving image capture mode, the controller 10 detects the pressed moving image capture mode key at step 311, and displays the moving image capture mode on the display 80, such that the camcorder phone converts a current mode into the moving image capture mode.

At step 312, if the user does not select an auto-zooming function by pressing an auto-zooming key to automatically adjust a size ratio of a target object and set up a uniform size of the target object moving in the moving image capture mode, the method proceeds to step 310 where a corresponding function is performed.

If the user selects an auto-zooming function by pressing an auto-zooming key which can automatically adjust a size ratio of a target object and set up a uniform size of the target object moving in the moving image capture mode, the controller 10 determines that the auto-zooming function has been selected at step 312, and displays a main target object setup screen image on the display 80, such that the user can select the main target object to be captured in the moving image capture mode.

The user selects a zoom-in key or a zoom-out key on the main target object setup screen image displayed on the display 80 to determine a zoom ratio, moves an arrow mark and a pointer configured in the form of a prescribed icon to the main target object to be captured by pressing a navigation key, and enters a selection key. If a touch screen is used, the user may select the main target object using a prescribed touch pen, and may also select the selection key using the touch pen. Therefore, if the selection key is selected, the controller 10 determines that the main target object has been selected, and detects coordinate information of the main target object selected by the pointer.

The controller 10 acquires a size ratio $\alpha$ of the main target object on the basis of the coordinate information of the main target object, sets up the moving image capture mode at the size ratio $\alpha$ of the main target object at step 313, and performs a moving image capture operation at the main target object size ratio $\alpha$ at step 314. The controller 10 determines the aforementioned main target object size ratio $\alpha$ to be a reference ratio, stores the determined size ratio $\alpha$ in the memory 29, and at the same time transmits a reset signal to the counter 30, such that it initializes a count value of the counter 30 and controls the counter 30 to count the image capture time.

The controller 10 determines whether the image capture time is longer than a predetermined time in order to perform the auto-zooming function of an embodiment of the present invention at intervals of a predetermined time at step 315. If it is determined that the count value read from the counter 30 is equal to a predetermined count value, the controller 10 determines that the image capture time is longer than the predetermined time, detects coordinate information of the main target object according to an outline extraction method and a block-unit detection method upon receiving the output video data from the video processor 70, and calculates an area of the detected coordinate, such that it can acquire a size ratio $\beta$ of the captured main target object at step 316.

The outline extraction method and the block-unit detection method have already been applied to the Moving Picture Experts Group 4 (MPEG-4) format, such that a variety of theories have been proposed. Therefore, the present invention can use the outline extraction method and the block-unit detection method using only corresponding specifications or applications. The outline extraction method and the block-unit detection method are well known to those skilled in the art. Thus, a detailed description will herein be omitted for convenience.

The controller 10 reads the main target object size ratio $\alpha$ indicative of a reference ratio from the memory, and determines whether the read main target object size ratio $\alpha$ is equal to the other main target object size ratio $\beta$ at step 317. If it is determined that the main target object size ratio $\alpha$ indicative of a reference ratio is equal to the other main target object size ratio $\beta$ at step 317, the controller 10 outputs video data of the captured frame to the display 80 at step 318, and returns to step 315 to determine whether the predetermined time elapses.

Otherwise, if it is determined that the main target object size ratio $\alpha$ indicative of the reference ratio is different from the other main target object size ratio $\beta$ at step 317, the controller 10 zooms in on the captured video data at step 319 or zooms out from the captured video data at step 320 to allow the main target object size ratio $\alpha$ to be equal to the other main target object size ratio $\beta$, and thereby displays the zoom-in or zoom-out video data on the display 80.

If it is determined that the main target object size ratio $\beta$ of the captured frame is less than the other main target object size ratio $\alpha$ indicative of the reference ratio, the controller 10 calculates a difference ratio A between the size ratios $\beta$ and $\alpha$, and controls a control signal to the video processor 70, such that the video processor 70 zooms in on the captured frame image based on the difference ratio A at step 319. Therefore, the video processor 70 zooms in on the frame having the main target object size ratio $\beta$ by the difference ratio A, and displays the zoom-in video data on the display 80, such that the captured frame can be automatically and digitally zoomed in.

The interpolation method is a general digital zoom-in method, and acquires pixel data newly generated during the zoom-in mode from the nearest pixel data of source data. The interpolation method is classified into an adaptive interpolation method and a nonadaptive interpolation method. Interpolation methods are well known in the art, such that its detailed description will herein be omitted for the convenience of description.

If it is determined that the main target object size ratio $\beta$ of the captured frame is higher than the other main target object size ratio $\alpha$ indicative of the reference ratio, the controller 10 calculates a difference ratio B between the size ratios $\alpha$ and $\beta$, and controls a control signal to the video processor 70, such that the video processor 70 zooms out from the captured frame image based on the difference ratio B at step 320. Therefore, the video processor 70 extracts only predetermined pixel data from overall video data according to the size ratio, determines a variety of blocks, zooms out from the frame having the main target object size ratio $\beta$ by the difference ratio B according to a prescribed conversion method such as a 3×3 median method, and displays the video data on the display 80. Therefore, the captured frame is automatically and digitally zoomed out.

The 3×3 median method is also considered to be a general image zoom-out processing method for processing video data, such that its detailed description will herein be omitted.

The captured video data is stored in the memory 29. The video data stored in the memory 29 is displayed on the display 80 when a user commands the video data to be reproduced after the video data has been captured.

The controller 10 determines whether an image capture termination key is pressed at step 321. If it is determined that the image capture termination key has not been pressed at step 321, the controller 10 returns to step 315. Otherwise, if it is determined that the image pick termination key has been pressed at step 321, the controller 10 stops the moving image capture operation.

Therefore, the auto-zooming control method for use in a camcorder phone compares the main target object size ratio of video data captured at intervals of a predetermined time with an initially-setup main target object size ratio, and zooms in on the captured video data or zooms out from the captured video data by a difference between the two size ratios, such that the main target object can be captured at a uniform main target object size.

As apparent from the above description, the auto-zooming control method for use in a mobile terminal called a camcorder phone according to the embodiment of the present invention compares a user-selected main target object size ratio with the other size ratio of the main target object captured by the camcorder phone, zooms in on the video data or zooms out from the video data by a difference between the two size ratios, such that it can uniformly maintain the size of the main target object and capture a stable image. Furthermore, the camcorder phone captures the target object that matches a predetermined main target object size irrespective of a distance between the camcorder phone and the captured target object, resulting in greater convenience for users who wish to capture a desired target object from various locations.

Although embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling an auto-zooming operation of a mobile terminal having a video capture function to automatically adjust a target object size to be equal to a predetermined target object size, the method comprising the steps of:
   determining whether an auto-zooming function is selected during a moving image capture mode, and determining a size ratio of a main target object to be captured when the auto-zooming function is selected;
   selecting the determined main target object size ratio to be a reference ratio, and capturing the main target object; and
   determining whether a main target object size ratio of video data captured during the moving image capture mode is equal to the reference ratio, and performing a zoom-in operation or a zoom-out operation when the main target object size ratio of the captured video data is different from the reference ratio to enable the main target object size ratio that was changed during the moving image capture mode to be equal to the reference ratio.

2. The method as set forth in claim 1, wherein the second determining step further comprises the step of:
   determining whether an image capture time is longer than a predetermined time, and adjusting a zoom ratio when the image capture time is longer than the predetermined time to enable a main target object size ratio of video data generated at the predetermined time to be equal to the reference ratio.

3. The method as set forth in claim 2, wherein the predetermined time comprises a specific time at which a predetermined count value is equal to a count value of a counter.

4. The method as set forth in claim 1, further comprising the steps of:
   if the size ratio of the captured main target object is less than the reference ratio, calculating a difference ratio between the reference ratio and the main target object size ratio, and zooming in on the captured video data based on the calculated difference ratio; and
   if the size ratio of the captured main target object is larger than the reference ratio, calculating a difference ratio between the reference ratio and the main target object size ratio, and zooming out from the captured video data based on the calculated difference ratio.

5. The method as set forth in claim 1, wherein the first determining step further comprises the steps of:
   determining a zoom ratio by pressing a zoom-in key or a zoom-out key, and determining a main target object to be captured on a current screen image;
   detecting a coordinate of the determined main target object; and
   calculating an area of the main target object on the basis of the detected coordinate, and storing a size ratio acquired from the calculation.

6. The method as set forth in claim 5, wherein the determining a zoom ratio step further comprises the step of:
   moving an arrow mark and a pointer configured in the form of a specific icon to the main target object, and selecting the main target object.

7. The method as set forth in claim 1, further comprising the step of:
   storing video data captured at the main target object size ratio.

8. A mobile terminal having a video capture function and adapted to automatically adjust a target object size to be equal to a predetermined target object size, the mobile terminal comprises:
   a camera adapted to capture an image;
   a memory adapted to store moving image signals; and
   a controller adapted to
   determine whether an auto-zooming function is selected during a moving image capture mode, and determine a size ratio of a main target object to be captured when the auto-zooming function is selected;
   select the determined main target object size ratio to be a reference ratio, and capture the main target object; and
   determine whether a main target object size ratio of video data captured during the moving image capture mode is equal to the reference ratio, and perform a zoom-in operation or a zoom-out operation when the main target object size ratio of the captured video data is different from the reference ratio to enable the main target object size ratio that was changed during the moving image capture mode to be equal to the reference ratio.

9. The mobile terminal of claim 8, wherein the controller is further adapted to determine whether an image capture time is longer than a predetermined time, and adjust a zoom ratio when the image capture time is longer than the predetermined time to enable a main target object size ratio of video data generated at the predetermined time to be equal to the reference ratio.

10. The mobile terminal of claim 9, wherein the predetermined time comprises a specific time at which a predetermined count value is equal to a count value of a counter.

11. The mobile terminal of claim 8, wherein the controller is further adapted to calculate a difference ratio between the reference ratio and the main target object size ratio and if the size ratio of the captured main target object is less than the reference ratio to zoom in on the captured video data based on the calculated difference ratio; and calculate a difference ratio between the reference ratio and the main target object size ratio and if the size ratio of the captured main target object is larger than the reference ratio to zoom out from the captured video data based on the calculated difference ratio.

12. The mobile terminal of claim 8, wherein the controller is further adapted to determine a zoom ratio by pressing a zoom-in key or a zoom-out key, and determine a main target object to be captured on a current screen image;

detect a coordinate of the determined main target object; and calculate an area of the main target object on the basis of the detected coordinate, and store a size ratio acquired from the calculation.

13. The mobile terminal of claim 12, wherein the controller is further adapted to move an arrow mark and a pointer configured in the form of a specific icon to the main target object, and select the main target object.

14. The mobile terminal of claim 8, wherein the controller is further adapted to store video data captured at the main target object size ratio.

* * * * *